June 8, 1926.
O. H. GOETZ
1,587,517
AUTOMOBILE BUMPER BRACKET
Filed July 30, 1924
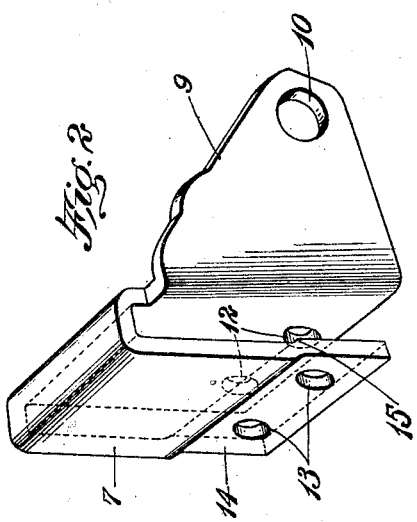
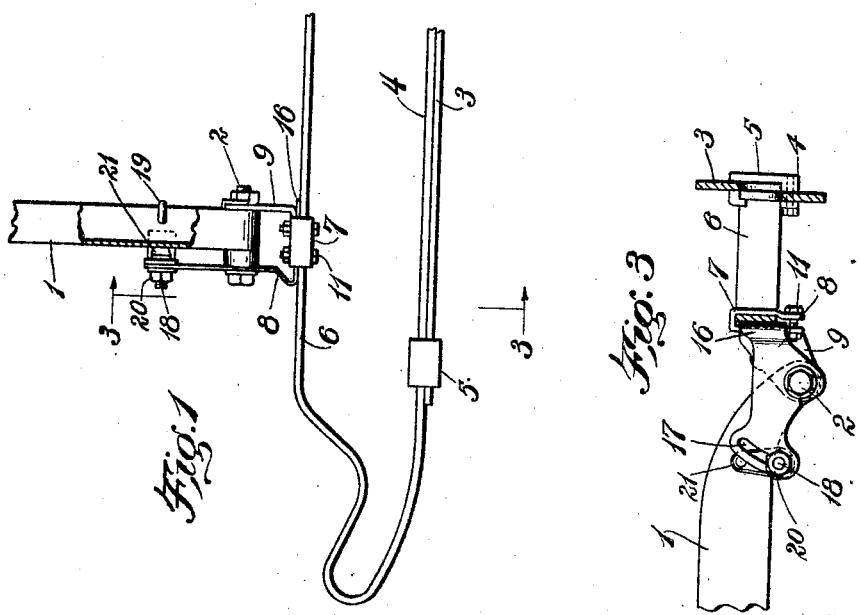
INVENTOR
OSCAR H. GOETZ.
BY
John H. Hilliard
ATTORNEY Patented June 8, 1926.

1,587,517

UNITED STATES PATENT OFFICE.

OSCAR H. GOETZ, OF BRIDGEPORT, CONNECTICUT, ASSIGNOR TO AMERICAN CHAIN COMPANY, INC., A CORPORATION OF NEW YORK.

AUTOMOBILE BUMPER BRACKET.

Application filed July 30, 1924. Serial No. 729,032.

This invention relates to devices for attaching bumpers to automobiles, and is of particular utility when embodied in the construction of attaching devices for spring-bar bumpers, although I contemplate the use of my improvements in any field for which they are adapted by their nature.

An important object of the invention is to provide an improved device for attachment of such a bumper to the spring bolt which connects the chassis springs with a horn of the automobile frame in many standard types of automobiles, this attachment device comprising a clamping member having an attaching portion to be secured to the spring bolt, at the inner side of the horn, and having formed integrally therewith a U-shaped clamping portion, or yoke, preferably inverted, to receive and support the bumper bar, with clamping bolts to compress the clamp upon the bar.

This one-piece clamping member, according to my invention, is of a universal character in its basic elements of structure just named, so that in its commercial production the same developed blank can be utilized with but slight manufacturing variations to furnish clamping members for several different makes of automobiles, and is designed for use in conjunction with an attachment arm which comprises an attaching portion to be secured to the same spring bolt, but at the outer side of the horn member, being co-axially disposed thereon in opposed relation to the clamping member, and the attachment arm having also a connecting portion extending into the U-shaped yoke of the clamp, preferably in a plane parallel to that of the bumper bar, being clamped to said bar by the clamping bolts of the yoke when the bolts are tightened after assembly of the clamping member with the attachment arm and bumper bar.

This connecting portion of the attachment arm accordingly partakes of the universal character of the clamping member, so that the clamping member and attaching arms form a two-piece couple that can be installed interchangeably upon all automobiles of the several types having suitably situated spring bolts, the couple constituting a unitary structure adjustable rotatively around the axis of the spring bolt, and this unitary structure, so adjustable, preferably includes a set consisting of two of these couples, one for the spring bolt on each horn, and also includes the bumper bar clamped within the respective yokes of the couples and joining them across the automobile, whereby the spring bar bumper thus installed can be rotated, with its supporting couples, around the axis of the spring bolts, and by tightening the spring bolts this unitary structure can be secured in adjusted position, with the bumper bar presented properly to receive impacts.

Referring to the drawings:

Figure 1 is a diagrammatic top view of the right-hand horn of an automobile frame with part of a bumper attached.

Figure 2 is a perspective view of a clamping member, isolated.

Figure 3 is a vertical section on the line 3—3.

In the illustrated embodiment of the invention, the reference character 1 designates the right hand front end or horn of an automobile frame, having a spring-bolt 2 of conventional form, and I have shown in place thereon a spring-bar bumper of well known form, comprising offset impact-receiving members or bars 3 and 4 connected together by a clamp 5, one of these members being bent upon itself to form a return portion 6 constituting an attaching bar.

In carrying the invention into effect, this bumper bar is supported adjustably by the spring-bolt 2 through the medium of an attachment couple comprising a clamping member 7 and a co-operating attachment arm 8, this couple forming with the bumper a unitary structure that can be rotated for adjustment around the axis of the spring-bolt 2, and can be secured in adjusted position by tightening the spring-bolt.

In accordance with my invention the clamping member is formed as an integral device comprising an attaching portion 9 with a hole 10 to receive the end of the spring bolt 2 next to the inner side of the horn 1, and having a clamping portion 7 preferably taking the form of an inverted U-shaped yoke, formed at an angle suitable to present this clamping portion in front of the horn in proper position to receive the bumper bar member 6, having clamping bolts or screws 11 passing through holes 12 and 13 arranged to afford a desirable play of the bolts when tightened to draw back the free yoke portion 14, which is preferably formed with a slight outward cant, as shown in Figure 2, to permit easy introduction of the bumper bar from below in assembly of the same, and which may advantageously be offset somewhat as at 15 to form a shoulder designed to prevent downward slippage of the bumper bar.

A clamp preferably symmetrical in every respect with the clamp 7 just described, may be, and preferably will be, provided for the left-hand horn, one being of right-hand formation and the other of left-hand formation, and in the commercial production of these clamps the same developed blank can be utilized with but slight variations to furnish clamping members for several different makes of automobiles.

The other member 8 of each bumper attachment couple is an attachment arm designed to fit upon the end of the spring bolt at the outer side of the horn, in opposed relation to the clamping member 7, and having a connecting portion 16 disposed at an angle suitable to enter the yoke of the clamp 7 in a plane parallel with that of the bumper bar, and to be secured therewith by the tightening of the clamping bolts 11.

Each attachment arm is preferably provided with suitable means to permit it to be anchored or stabilized, and for this purpose I have shown a slot 17 to receive adjustably a suitable stabilizer or anchor device, which may conveniently take the form of a hook-bolt such as that shown at 18, having a hook 19 to be engaged with the under flange or edge of the horn, when the latter is of the channel bar type illustrated, the bolt having a nut 20 and being provided with a spacer block 21 which is fitted to the bolt between the arm and the horn.

Having described my invention, I claim:—

1. Means for the attachment of a bumper to an automobile at the region of the spring bolt, said means comprising a clamping member having an attaching portion to be fitted upon the spring bolt and having also an integral clamp portion to receive the bumper and means to secure said clamp to said bumper; and an attachment arm also to be fitted upon said spring bolt and having a connecting portion to be secured by said clamp, said clamping member and attachment arm constituting an attachment couple adjustable rotatably around the axis of said spring bolt.

2. An automobile bumper bracket adapted for the attachment of a bumper to the spring bolt, said bracket comprising a clamping member having a perforated plate to be transfixed by the spring bolt and having also an integral clamp portion to receive the bumper and means to secure said clamp to said bumper; and an attachment arm also having a perforated plate to be transfixed by said spring bolt and having a connecting portion to be secured by said clamp, said clamping member and attachment arm being adapted to be retained in assembled relation by said spring bolt and constituting an attachment couple adjustable rotatably around the axle of said spring bolt, and means connected with said attachment arm to anchor or stabilize said couple in adjusted rotative position.

3. Means for the attachment of a bumper to the horn of an automobile at the region of the spring bolt, said means comprising a clamping member having an attaching portion to be fitted upon the spring bolt and having also an integral clamp portion to receive the bumper and means to secure said clamp to said bumper; and an attachment arm also to be fitted upon said spring bolt and having a connecting portion to extend within and be secured by said clamp; said clamping member and attachment arm constituting an attachment couple to embrace said horn.

4. Means for the attachment of a bumper to the horn of an automobile at the region of the spring bolt, said means comprising a clamping member having a perforated attaching portion to be transfixed by the spring bolt and secured thereby to the horn, said clamping member having also an integrally formed clamp portion to receive the bumper and means to secure said clamp to said bumper.

5. Means for the attachment of a bumper to the horn of an automobile at the region of the spring bolt, said means comprising a clamping member having a perforated attaching portion to be transfixed by the spring bolt and secured thereby to the horn, said clamping member having also an integrally formed clamp portion to receive the bumper and means to secure said clamp to said bumper, said clamping portion being U-shaped, with an inwardly directed shoulder on one arm to aid in positioning the bumper.

6. Means for the attachment of a bumper to the horn-spring-bolts of an automobile, said means comprising a pair of U-shaped clamping brackets each having a perforated integral plate adapted to be transfixed by one of said spring bolts and thereby secured to one of said horns, said pair of U-shaped clamps being symmetrical and invertible to permit attachment exchangeably to the horns, whereby the bumper may be supported at different heights by the horns.

In witness whereof I have signed this specification.

OSCAR H. GOETZ.